(12) United States Patent
Crosswhite et al.

(10) Patent No.: US 8,671,356 B1
(45) Date of Patent: *Mar. 11, 2014

(54) DYNAMIC DESKTOP ICON

(75) Inventors: Richard Neyland Crosswhite, Sterling, VA (US); Jay Kirk Franklin, Frederick, MD (US); Thomas Marr, Purcellville, VA (US); John Caldwell, Washington, DC (US); Thomas G. Leon, Bethesda, MD (US)

(73) Assignee: Bright Sun Technologies, San Francisco, CA (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/569,391

(22) Filed: Sep. 29, 2009

Related U.S. Application Data (63) Continuation of application No. 11/616,670, filed on Dec. 27, 2006, now Pat. No. 7,603,629.

(60) Provisional application No. 60/864,835, filed on Nov. 8, 2006.

(51) Int. Cl.
*G06F 3/048* (2013.01)

(52) U.S. Cl.
USPC .......................................................... 715/772

(58) Field of Classification Search
USPC .................................. 715/772, 775, 778, 779
See application file for complete search history.

(56) References Cited

U.S. PATENT DOCUMENTS

| | | | |
|---|---|---|---|
| 5,654,905 A * | 8/1997 | Mulholland et al. | 702/186 |
| 5,995,101 A * | 11/1999 | Clark et al. | 715/711 |
| 7,151,938 B2 | 12/2006 | Weigand | |
| 2006/0095865 A1 | 5/2006 | Rostom | |
| 2006/0107231 A1* | 5/2006 | Matthews et al. | 715/788 |
| 2006/0259607 A1 | 11/2006 | O'Neal et al. | |
| 2007/0011146 A1* | 1/2007 | Holbrook | 707/3 |
| 2007/0260994 A1 | 11/2007 | Sciammarella et al. | |
| 2008/0046832 A1 | 2/2008 | Balasubramanian | |

OTHER PUBLICATIONS

"Dynamic Desktop", http://www.geocities.com/wvw/dd.html, Jun. 13, 2006, 2 pages.

Icon Image Set—Google Mapki "Icon Image Sets", http://www.mapki.com/wiki/Icon_Image_Sets , Jun. 12, 2006, 2 pages.

David H. Jonassen, "DynamIcons as dynamic graphic Interfaces: interpreting the meaning of a visual representation", http://www.intellectbooks.com/iconic/dynamic/dynamic.htm , Jun. 12, 2006, 16 pages.

(Continued)

*Primary Examiner* — Thanh Vu
(74) *Attorney, Agent, or Firm* — Fenwick & West LLP (57) ABSTRACT

A first desktop icon is displayed on a computer desktop. The icon is configured to enable execution of a first application. Based on an evaluation of business rules, the first icon is changed to a second icon. The second icon is configured to execute a second application.

14 Claims, 12 Drawing Sheets

(56) References Cited

OTHER PUBLICATIONS

Jonesson D. et al., MERlin: Dynamicons As Graphic Interfaces, DynamIcons as Dynamic Graphic Interhttp://orion.njit.edu/merlin/publications/references/dynamicons.html, Jun. 12, 2006, 17 pages.

P. Korica and H. Maurer, DynEST—Dynamically Explained Symbols for Traffic or Learning How to Drive Without Words, 7 pages, http://64.233.161.104/search?q=cache:AykO5ILDMnYJ:www.iicm.edu/iicm_papers/eLearn05_DynEst.pdf+static+icons+and+dynamic+icons&hl=en&gl=us&ct=clnk&cd+16 (DynEST) (2005).

Stuart Mealing, "A Computer-based Iconic Language" Department of Computer Science, University of Exeter—England, http://www.intellectbooks.com/iconic/com_base/icon-2.htm, 6 pages (1990).

Ronald Baecker et al., "Bringing Icons to Life", http://64.233.161.104/search?q=cache:U879QLy8HycJ:kmdi.utoronto.ca/rmb/papers/D22.pdf+static+icons+and+dynamic+icons&hl=en&gl=us&ct=clnk&cd=21, 6 pages (1991).

\* cited by examiner

DYNAMIC DESKTOP ICON

CROSS REFERENCE TO RELATED APPLICATIONS

The present application is a continuation (and claims the benefit of priority under 35 USC 120) of U.S. application Ser. No. 11/616,670, filed Dec. 27, 2006, which claims the benefit of U.S. provisional application Ser. No. 60/864,835, filed Nov. 8, 2006. The contents of the prior applications are incorporated herein by reference in their entirety.

TECHNICAL FIELD

This disclosure relates to a dynamic desktop icon.

BACKGROUND

A desktop displayed on an electronic device, such as a computer system or mobile device, may display one or more static icons that enable access to applications or services available on the electronic device. The one or more static icons run executable files resident on the hard drive of the system to enable access to the applications and/or services. The executable file associated with the desktop icon is executed when the icon is selected (e.g., "clicked on") using, for example, a mouse or other input tools. In one example, an icon may represent a web browser such as Internet Explorer® from Microsoft™ Corporation. Upon being activated, the "Internet Explorer" icon executes the Internet Explorer® browser application, which enables the user to browse the Internet. Generally, the computer desktop displayed on the computer system is provided with limited real estate for displaying the one or more static icons. As such, as the number of static icons increases, the real estate space to display the static icons on the computer desktop may naturally decrease.

SUMMARY

According to one general aspect, a first desktop icon is displayed on a computer desktop. The first desktop icon is configured to enable execution of a first application. A set of business rules is accessed and evaluated to determine whether to change the first desktop icon to a second desktop icon. The second desktop icon is configured to execute a second application. In response to the evaluation of the business rules resulting in a determination that the first desktop icon should be changed to the second desktop icon, the first desktop icon is changed to the second desktop icon to enable execution of the second application.

Implementations of the above general aspect may include one or more of the following features. For example, displaying the first desktop icon may include displaying the first desktop icon on an original equipment manufacturer computer system. The first application may include a browser configured to automatically load a resource located at a first uniform resource locator, and the second application may include the browser configured to automatically load a resource located at a second uniform resource locator. The first icon may launch a different program than the second icon. The first desktop icon may be displayed at a first location on the computer desktop and the second desktop icon may be displayed at the first location on the computer desktop.

Evaluating the set of business rules may include detecting a type of Internet connection. Alternatively or additionally, evaluating the set of business rules may include detecting an amount of time that has passed since the first desktop icon was first displayed. The computer desktop may be displayed by a computer system and evaluating the set of business rules may include detecting an amount of time that has passed since the computer system was first booted by a consumer. Alternatively or additionally, the computer desktop may be displayed by a computer system and evaluating the set of business rules may include detecting a number of times the user has logged into the computer system. Alternatively or additionally, evaluating the set of business rules may include detecting an elapsed time since a user logged into the computer system.

Implementations of the above general aspect also may include animating the first desktop icon. Animating the first desktop icon may comprise displaying a commercial upon detecting a triggering event. Changing the first desktop icon to the second desktop icon may include changing a text description or bitmap associated with the first desktop icon to a text description or bitmap associated with the second desktop icon. Implementations of the above general aspect also may include displaying a commercial related to the first desktop icon upon detecting a triggering event.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In one implementation, the dynamic desktop icon ("DDI") application displays on a computer desktop a dynamic desktop icon that changes from a first desktop icon to a second desktop icon based on a set of business rules. The DDI application can provide, within a single location, two or more different desktop icons at different time instances. For instance, the icons may be displayed at specified time intervals. This may be advantageous in an environment where the number of icons that can be displayed on the computer desktop are limited. For example, an online service provider may try to obtain new users or subscribers by pre-loading software for its products or service(s) on an original equipment manufacturer ("OEM") computer, and place an icon for launching the software on a desktop of the OEM computer, so as to attract the attention of the user. However, an agreement between the online service provider and the OEM may be limited, such that the online service provider can only use one or more spots on the computer desktop to place icons. This limits the number of products or services the online service provider can promote. The DDI application can take advantage of the limited space by consecutively displaying different icons (e.g., related to different services) within a single location on the desktop.

In particular, in one implementation, the DDI application accesses a set of business rules and evaluates the set of business rules to determine whether to change the first desktop icon to the second desktop icon. When the business rules indicate that the first desktop icon should be changed to the second desktop icon, the DDI application changes the first desktop icon to the second desktop icon. As part of changing the first desktop icon to the second desktop icon, the DDI application may change the bitmaps and/or text description associated with the first icon to the bitmaps and/or text description associated with the second desktop icon. The first and second desktop icons may each execute different applications.

The different applications may be two different executable programs. For example, the first desktop icon may execute a browser program and the second desktop icon may execute a media player program. Alternatively, the different applications may be the same executable program, but for each, the program is in a different execution state. For instance, a first application may be a browser configured to display a first web page while the second application is the browser configured to display a second web page.

The set of business rules may include instructions for detecting an amount of elapsed time since the computer system was first booted and changing or selecting the displayed icon based on the elapsed time. For example, the DDI application may display a first desktop icon within the first week of the system's original boot up, and during the second week after the first boot up, the DDI application may change the first desktop icon to display a second desktop icon. The DDI application may change the displayed icon at specified time intervals to promote different services (or products) via a single icon placement.

The set of business rules may include instructions for detecting the type of the user's Internet connection and selecting particular icon(s) to be displayed based on the type of Internet connection. For example, if the DDI application determines that the user is equipped with a broadband connection (e.g., Verizon® DSL), the DDI application displays different desktop icons relevant to the user's broadband connection. The different desktop icons may include a broadband icon that conveys music, video, and/or games.

The set of business rules may include instructions for determining whether a user is a subscriber to an online service provider and, if so, the particular service provider (e.g., AOL®). The DDI application may select particular icon(s) for display on the desktop based on whether the user is the subscriber to a particular online service provider. For example, if the DDI application determines that the user is a subscriber to AOL®, the DDI application may display an icon (e.g., "AIM Phoneline" icon) available only to AOL® subscribers. Alternatively, if the DDI application determines that the user is not a subscriber to AOL® services, the DDI application may display a desktop icon requesting the user to sign up for AOL® services.

Figure 1:
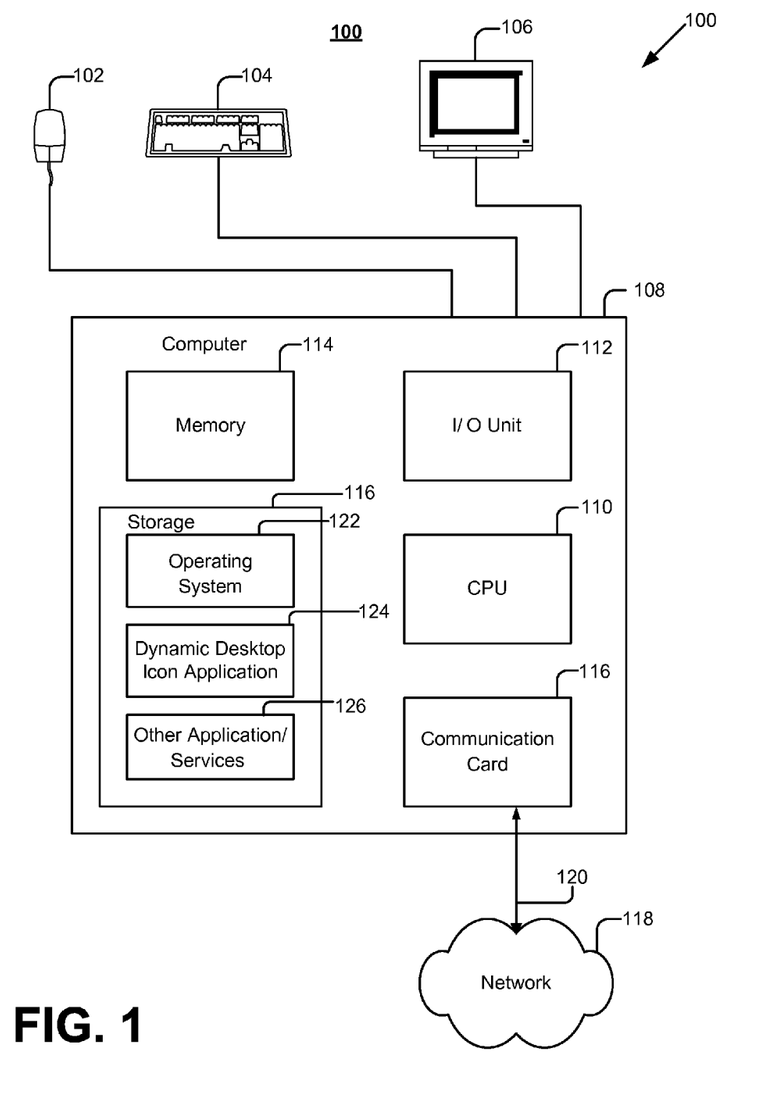
FIG. 1 illustrates an example of a computing system that includes a dynamic desktop icon ("DDI") application.

FIG. 1 illustrates an example of a computing system 100 that includes the DDI application. The hardware setup may include various input/output ("I/O") devices (e.g., mouse 102, keyboard 104, and display 106) and a central processing unit ("CPU") 108. CPU 108 may include a processor 110, an I/O unit 112, memory 114, and storage 116. CPU 108 also may include some sort of communications card or device 116 (e.g., a modem or a network adapter) for exchanging data with a network 118 via a communications link 120 (e.g., a telephone line, a wireless network link, or a cable network). System 100 may be implemented, for example, as a personal computer, a workstation, a server, a cellular telephone, or a personal digital assistant.

Storage 116 stores data and various programs such as an operating system (OS) 122. The OS 122 is a program that controls the functioning and interaction of the hardware components of system 100 and facilitates the operation of other programs being executed on system 100. Windows Me®, Windows XP®, Linux™, and MacOS™ are examples of common operating systems for personal computers. Windows CE® and Windows Embedded™ are examples of common embedded operating systems used in cellular telephones or personal digital assistants.

Storage 116 also stores a DDI application 124 and one or more other applications and/or services 126. The DDI application 124 controls a dynamic desktop icon displayed on a computer desktop. The DDI application 124 changes the dynamic desktop icon from a first desktop icon to a second desktop icon. The first desktop icon is configured to execute a first application while the second desktop icon is configured to execute a second application. In general, the DDI application 124 may access a set of business rules and may evaluate the set of business rules to determine when and whether to change the first desktop icon to a second desktop icon.

The business rules may be stored locally in the storage 116. For example, the business rules may be stored locally on the computer within an extensible markup language ("XML") document that is or is not part of the DDI application 124. Alternatively or additionally, the business rules may be stored in another storage, or may be stored remotely and may be accessed by the DDI application 124 through the network 118. The business rules may include instructions for determining a type of icon that should be displayed on the computer desktop. For example, the business rules may include instructions for monitoring the user's Internet connection type and displaying icons associated with the type of connection detected. For instance, if the user has a dial up connection, a "AOL® Advantage Dial-up free trial" icon may be displayed. If the user has a broadband connection, an "AOL® High Speed Essentials" icon may be displayed.

The business rules also may include instructions for monitoring an amount of elapsed time since a triggering event to determine whether to change a dynamic desktop icon from a first desktop icon to a second desktop icon. For example, the business rules may include instructions for monitoring the amount of elapsed time since the computer was first booted and changing the first desktop icon to the second desktop icon after a certain amount of time has elapsed since the first boot (e.g., one week). Alternatively or additionally, the business rules include instructions for monitoring the amount of elapsed time since an icon was previously changed and changing the first desktop icon to a second desktop icon after a certain amount of time has elapsed since it was changed (e.g., one week). Alternatively or additionally, the business rules include instructions for monitoring and detecting the type of peripheral devices connected to the computer and changing the first desktop icon to a second desktop icon based on the type of peripheral device detected.

Figure 2:
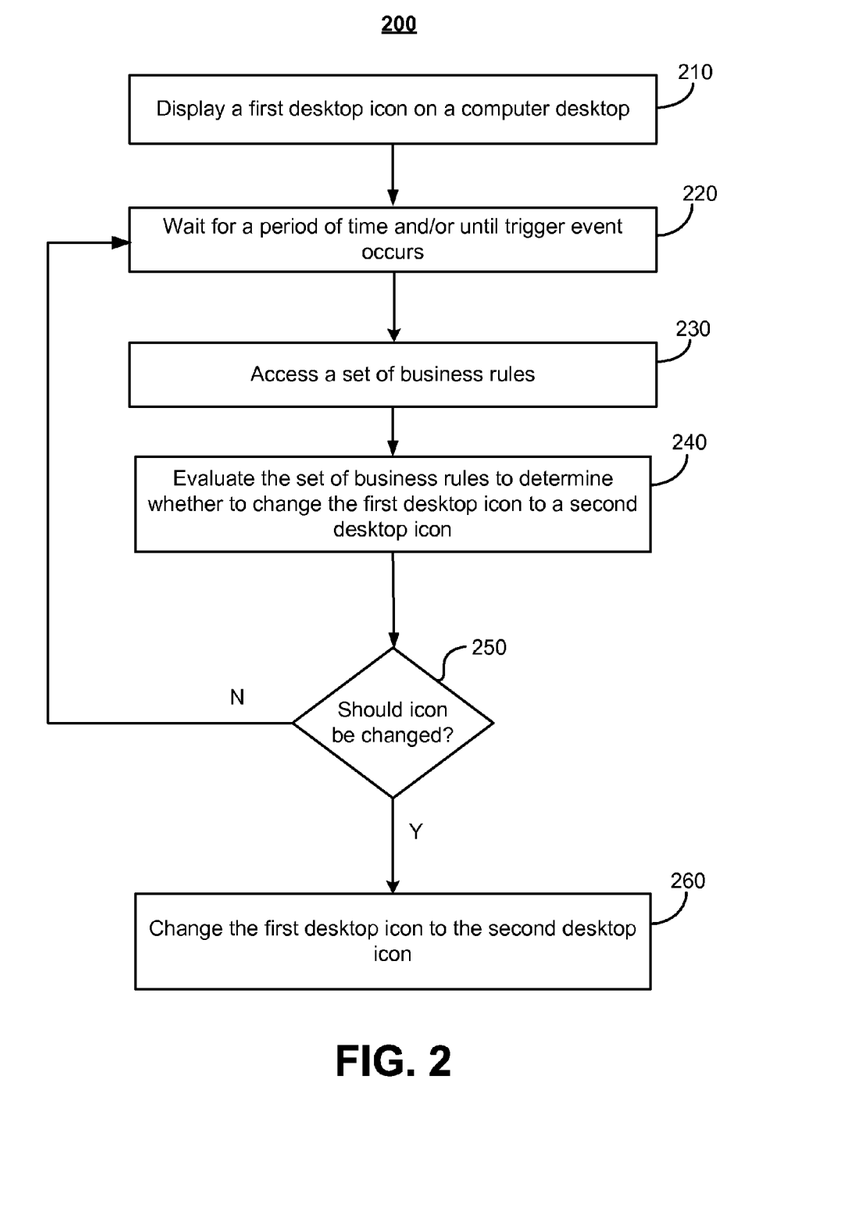
FIG. 2 illustrates an example of a process that a DDI application may use to change a first desktop icon to a second desktop icon.
Figure 3:
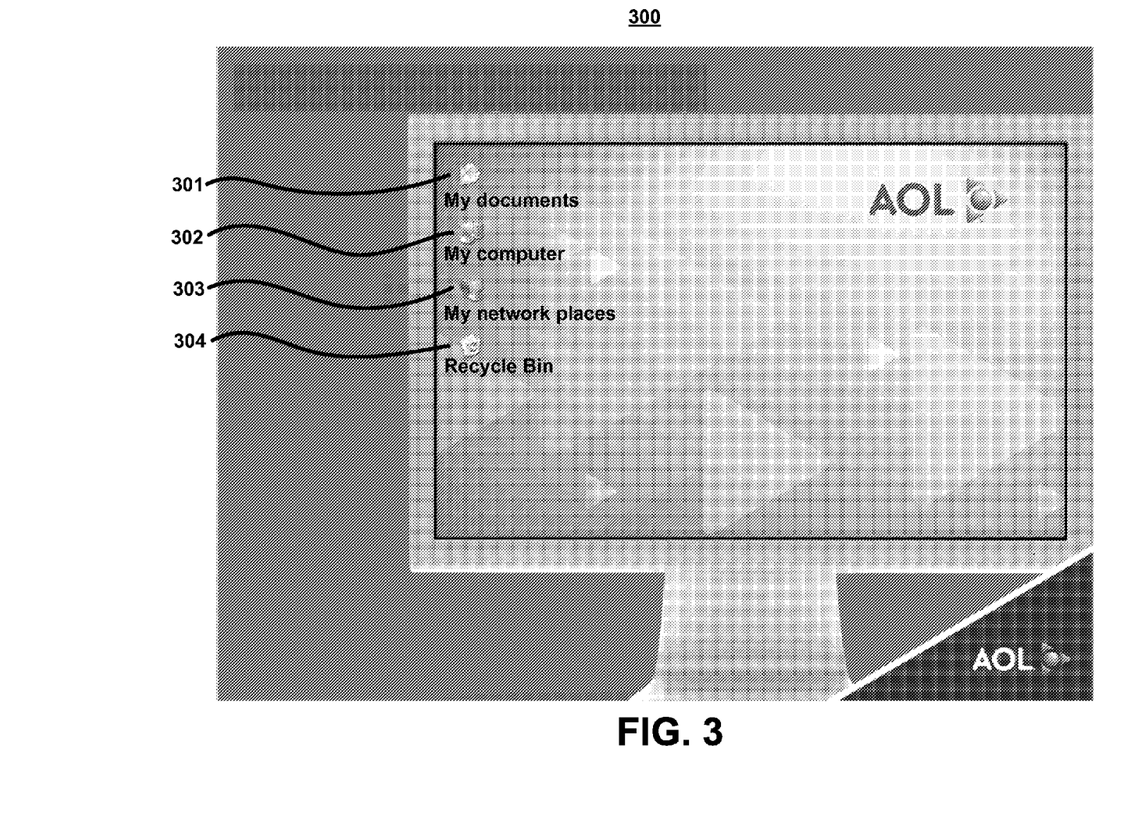
FIG. 3 illustrates an example of a computer desktop appearing on a computer system.
Figure 4A:
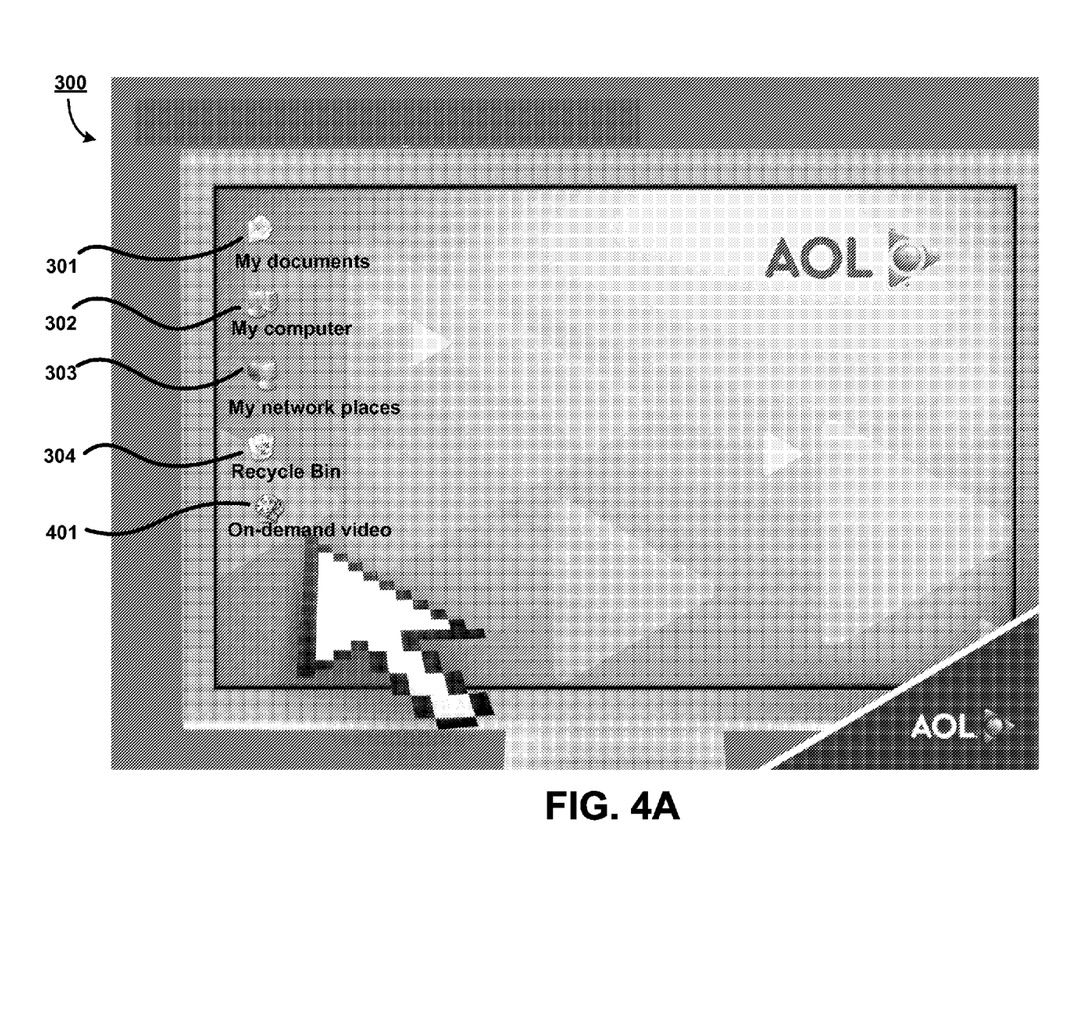
FIGS. 4A-4C illustrate a dynamic desktop icon displayed by a DDI application.

FIG. 2 illustrates an example of a process 200 that the DDI application 124 may use to change a first desktop icon to a second desktop icon. Below, process 200 is described with reference to FIGS. 3 and 4A-4C, each of which are later described in more detail. Process 200 begins with the DDI application 124 displaying a first desktop icon on a computer desktop (210). The first desktop icon is configured to execute a first application when selected. FIG. 3 illustrates an example of a computer desktop 300 appearing on a computer system. The computer system may include an OEM computer system. FIG. 4 illustrates the first icon 401 being displayed on the computer desktop 300.

After displaying the first desktop icon, the DDI application 124 waits for a period of time and/or until a trigger event occurs (220). The trigger event may include a computer system boot. Alternatively or additionally, the trigger event may include a specified number of logins by a user to a computer system. Alternatively or additionally, the trigger event may include the passing of a specified amount of time since the desktop icon was last modified. Once the period of time has elapsed or the trigger occurs, the DDI application 124 then accesses a set of business rules (230) and evaluates the set of businesses rules to determine whether to change the first desktop icon to a second desktop icon (240).

The business rules may include instructions for monitoring the amount of elapsed time since the computer was booted for the first time (e.g., amount of time since a consumer first started the computer) and changing the first desktop icon to a second desktop icon after a certain amount of time has elapsed since the computer was booted for the first time. For example, the business rules may indicate that the icon should be changed once a week has passed since the consumer of the OEM computer started the computer for the first time. Alternatively or additionally, the business rules may include instructions for monitoring the amount of elapsed time since the first desktop icon was displayed on the computer desktop and changing the first desktop icon to the second desktop icon after a certain amount of time has passed. In yet another example, the business rules may include instructions for monitoring the amount of elapsed time after the user logs into the computer system or the system is booted and changing the first desktop icon to the second desktop icon after a certain amount of time has passed from the login or boot time. For example, the business rules may indicate that the icon should be changed after two hours has passed since the user logged into the system or the system was started. As another example, the business rules may track date changes and consequently indicate that the icon should be changed after a certain number of days has passed since the user logged into the system or the system was started. In another example, the business rules may include instructions for monitoring the number of logins by the user and, after the number of logins by the user passes a threshold, changing the first desktop icon to the second desktop icon.

The business rules also may include instructions to monitor the type of Internet connection and to select an icon for the first or second desktop icon based on the detected connection type. In particular, the business rules may include instructions to determine whether the user has a narrowband, broadband, or no connection and to select an icon based on the detected connection type. In one implementation, the DDI application 124 monitors the type of Internet connection based on default connections installed/available on the computer system. The DDI application 124 may monitor the available connection only at system boot, or may monitor for changes in the connection type.

Additionally, the business rules may include instructions to determine whether the user is a subscriber to, or otherwise a user of, an online service provider and to select an icon based on whether the user is a subscriber or user of an online service provider and, if so, the particular service provider. For example, the business rules may include instructions for monitoring if the user is an existing AOL®, Netscape®, CompuServe™, and/or Wal-Mart Connect® member and, based on the membership type selecting an icon for the first or second (or other) desktop icons. This may be useful, for instance, when the provider of the DDI application 124 has a business relationship with one of the other providers and, as part of that relationship, wants to promote the services of the other provider. To detect the type of membership, the DDI application 124 may detect the installations of ISP services. For example, detection of AOL® 9.0 and AOL® OpenRide may imply that the user is an AOL® member.

Icons may be selected based on a combination of the various variables described above. For instance, one icon may be selected when the user is an AOL® member with a broadband connection while a different icon may be selected if the user is not an AOL® member and has a dial up connection. As another example, the icon may be selected based on monitoring the user's Internet connection type and the service provider that offers the detected type of Internet connection to the user. The icon selected may then be one that encourages the user to change to a different service provider, offering the same type of Internet connection. For instance, the DDI application 124 may determine the user subscribes to a dial up connection offered by a company other than AOL® (e.g., CompuServe™ services) and, in response, the DDI application 124 displays an icon (e.g., "AOL® Advantage risk free trial") on the computer desktop to encourage the user to subscribe to the dial up services offered by AOL®. In another example, the DDI application 124 may determine the user subscribes to broadband services offered by Wal-Mart Connect™ and, in response, the DDI application 124 may display an icon (e.g., "AOL®Video" icon) to encourage a user to use the video services offered by AOL®.

Figure 4B:
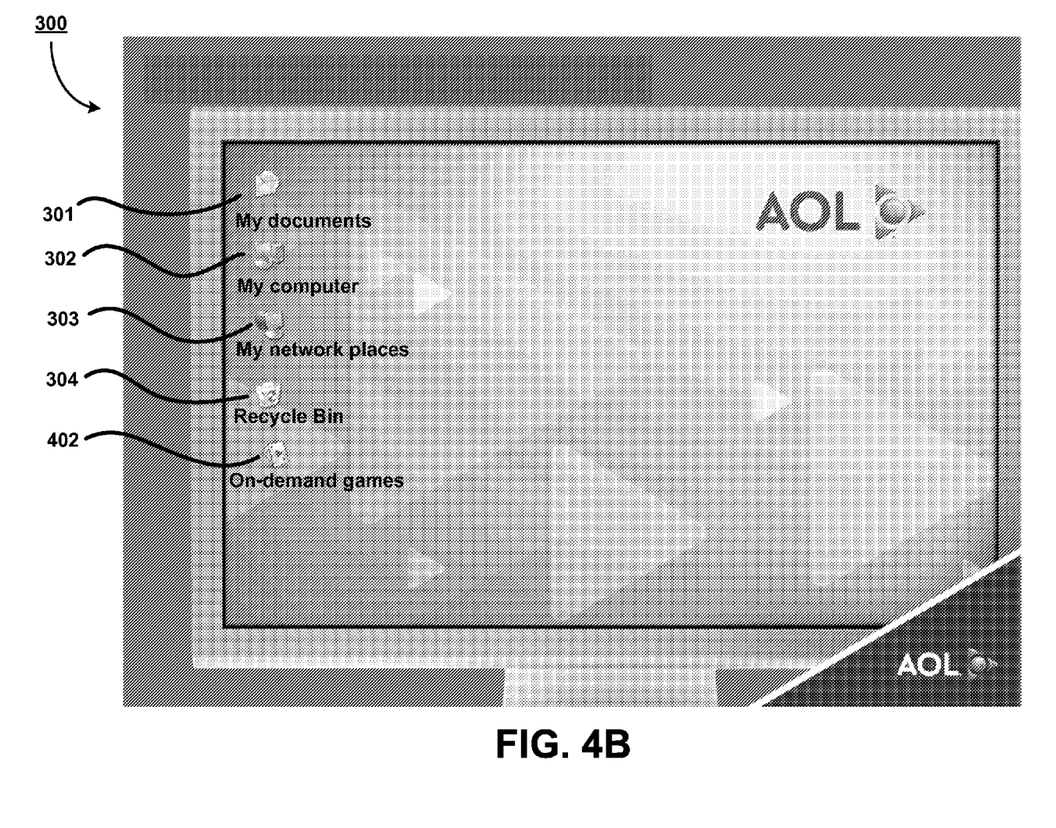
Figure 4C:
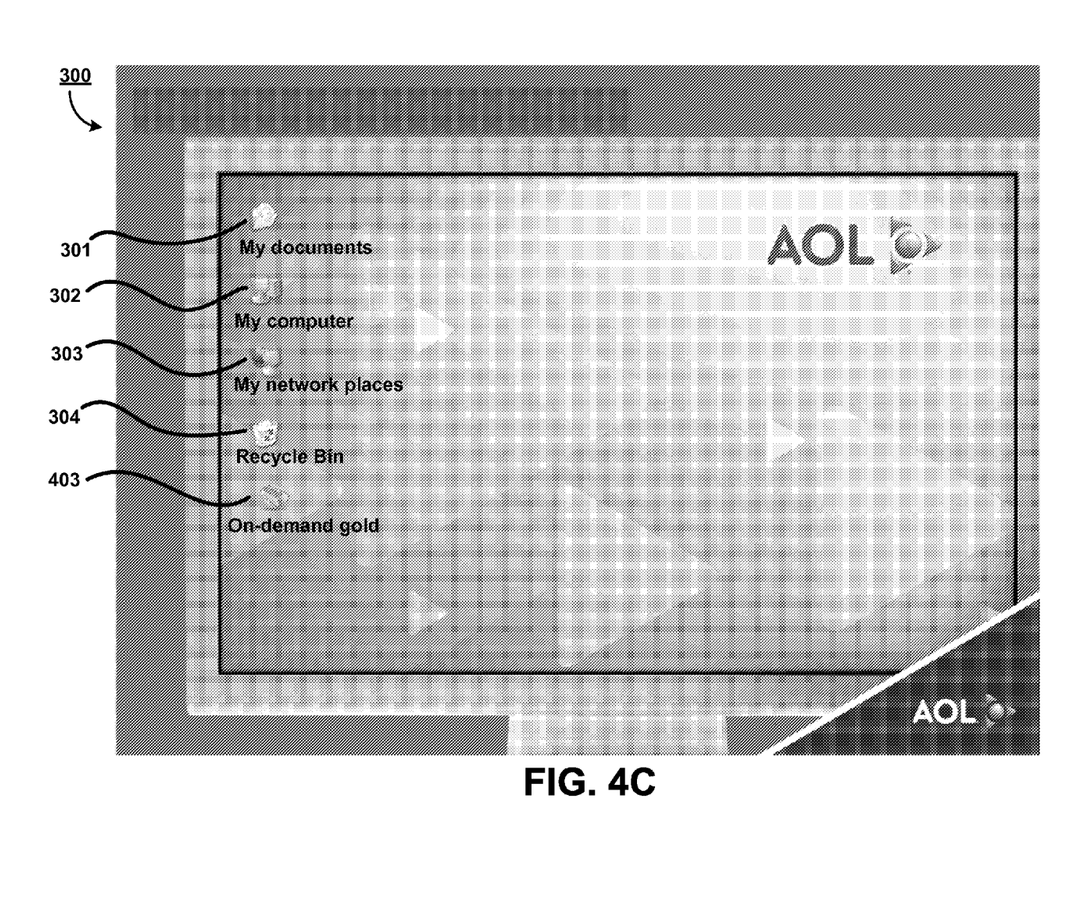

Referring again to FIG. 2, if the first desktop icon should not be changed (250), the DDI application 124 continues the operations 220 to 250. If the first desktop icon should be changed (250), the DDI application 124 changes the first desktop icon to a second desktop icon selected based on the business rules. The second icon may be configured to execute a second application (different from the first application) upon selection by the user. FIGS. 4B-4C illustrate the computer desktop 300 in which the first desktop icon shown in FIG. 4A is replaced by a second desktop icon (e.g., "On-Demand Games" icon 402 shown in FIG. 4B or "Gold Rush promotion" icon 403 shown in FIG. 4C).

Changing the first desktop icon to the second desktop icon may include changing the icon bitmap, text description, and/or hover-text description associated with the first desktop icon to the icon bitmap, text description, and/or hover-text description associated with the second desktop icon. Additionally, changing the first desktop icon to the second desktop icon may include changing the application associated with the first desktop icon to the application associated with the second desktop icon. The second application may be a different executable program than the first application. Alternatively, the second application may be the same executable program as the first application but may be configured with a different execution state. For example, if both the first and second applications include a browser, the browser may be configured to open a first web page when launched with the first icon and may be configured to open a second web page when launched with the second icon.

Below, a detailed example is described that includes business rules with instructions to monitor for the type of Internet connection and subscriber status to the AOL® service and to display a first desktop icon based on the connection type and subscriber status. The illustrated business rules also include instructions for monitoring the amount of time that has elapsed since the system's first boot up to change the first desktop icon to other icons.

1. Detect Connection Type
   1.1. If no connection detected, go to 2.
   1.2. If dial up connection detected, go to 3.
   1.3. If broadband connection detected, go to 4.
2. No Connection Detected (launch installer)
   2.1. Show Icon A and Text A'
   2.2. After 7 days of original boot up, show Icon A and Text B'
   2.3. After 14 days of original boot up, show Icon B and Text B'
   2.4. After 21 days of original boot up, show Icon C and Text C'
   2.5. After 60 days of original boot up, show Icon A and Text B'
   2.6 Continuously cycle through steps 2.1-2.5.
3. Dial up Connection Detected (launch installer)
   3.1. Non AOL® Member
      3.1.1. Show Icon A and Text A'
      3.1.2. After 7 days of original boot up, show Icon A and Text B'
      3.1.3. After 5 more days, show Icon B and Text B'
      3.1.4. After 5 more days, show Icon C and Text C'
      3.1.5. After 5 more days, show Icon D and Text D'
      3.1.6. After 5 more days, show Icon E and Text E'
      3.1.7. After 5 more days, go to 3.1.3 and cycle to 3.1.6
      3.1.8. After 3.1.7 completes, show Icon A and Text B'
      3.1.9. After 60 days, cycle through 3.1.3-3.1.7
      3.1.10. Return to Icon A and Text A
      3.1.11 Do not cycle through steps 3.1.2-3.1.9
   3.2. AOL® Member
      3.2.1. Show Icon G and Text G'
      3.2.2. After 7 days, show Icon G and Text I'
      3.2.3. After 5 more days, show Icon H and Text H'
4. Broadband Connection Detected
   4.1. Non AOL® Member
      4.1.1. Show Icon I and Text I'—launch installer
      4.1.2. After 7 days of original boot up, show Icon K and Text K'
      41.3. After 5 more days, show Icon L and Text L'
      4.1.4. After 5 more days, show Icon M and Text M'
      4.1.5. After 5 more days, show Icon N and Text N'
      4.1.6. After 5 more days, show Icon O and Text O'
      4.1.7. After 5 more days, show Icon P and Text P'
      4.1.8. After 5 more days, show Icon Q and Text Q'
      4.1.9. Cycle through 4.1.3-4.1.8
   4.2. AOL® Member
      4.2.1. Show Icon R and Text R'

Below, earlier referenced FIGS. 3 and 4A-4C are described in more detail to illustrate an output of the process 200 carried out by the DDI application 124. FIG. 3 illustrates the desktop 300 appearing on a computer system. The computer desktop includes multiple icons. The multiple icons include "My documents" icon 301, "My computer," icon 302, "My network places" icon 303, and a "recycle bin" icon 304.

FIG. 4A illustrates the computer desktop 300 of FIG. 3 modified to include a first desktop icon added by the DDI application 124. The first desktop icon 401 is located below the "recycle bin" icon 304 and is a broadband icon that launches an application for On-Demand Video services. The first desktop icon 401 may launch applications for other services such as, for example, music, photography, games, sports, or security services. The DDI application 124 accesses a set of business rules and evaluates the set of business rules to determine whether to change the first desktop icon 401 to a second desktop icon. As pointed out above, the business rules may include, for example, instructions for monitoring the amount of time that has elapsed since the computer was first booted and changing the first desktop icon 401 to a second desktop icon based on the amount of elapsed time. For example, the business rules may include changing the first desktop icon 401 to the second desktop icon 402 (shown in FIG. 4B) after, for example, after seven days have passed since the system's original boot up. Also, the second icon may be selected based on variables such as connection type, subscriber status, and/or other variables.

Referring to FIG. 4B, the second desktop icon 402 appears in the same position as the first desktop icon 401 and is configured to execute an application for On-line broadband games. Additionally, the set of business rules also may include instructions to change the second desktop icon 402 to a third desktop icon 403 (shown in FIG. 4C) after, for example, fourteen days have passed since the system's original boot up. Referring to FIG. 4C, the third desktop icon 403 replaces the second desktop icon 402 and is configured to execute a browser application that is configured to automatically load a specified uniform resource location.

In another implementation, in addition to being able to change a displayed desktop icon to a different desktop icon, the DDI application 124 also is configured to run motion video and audio on the computer desktop when an icon is clicked, cursor is hovered over the icon, or in response to another triggering event. In particular, the DDI application 124 is configured to monitor for an event (e.g., mouse hovers and/or mouse click) and, in response to the event to display, e.g., a commercial and/or to animate the desktop icon. As such, the DDI application 124 enables the presentation of useful information about the application and/or services associated with the displayed desktop icon before the user actually launches the application and/or services.

Figure 5:
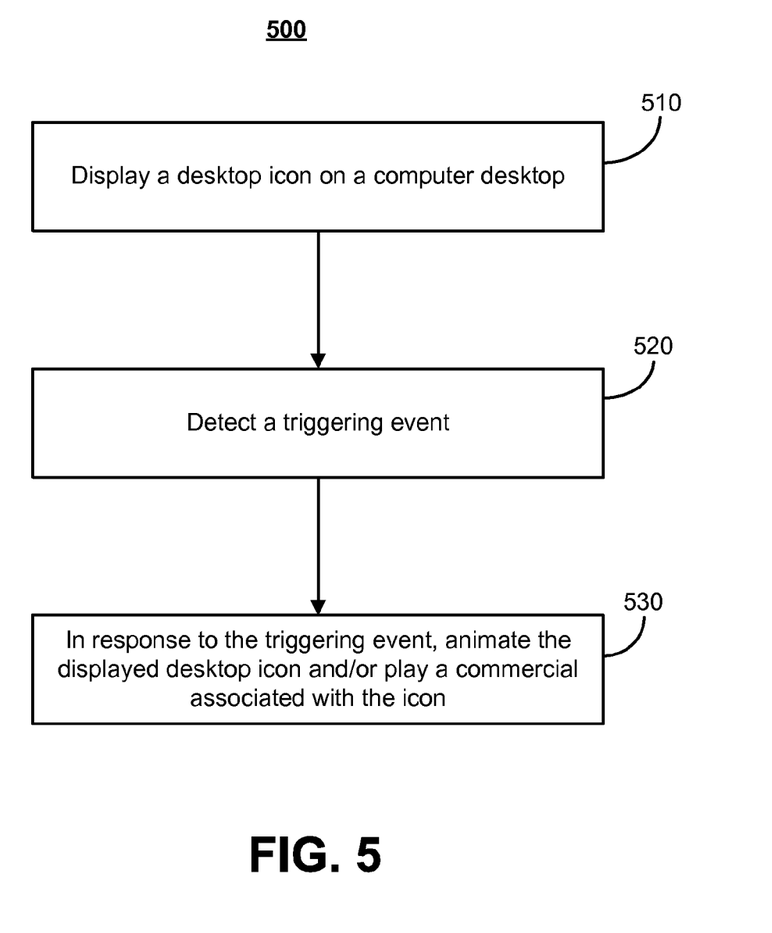
FIG. 5 illustrates an example of a process a DDI application may use to display an informational or promotional video (e.g., a commercial) associated with the displayed desktop icon.

FIG. 5 illustrates an example of a process 500 that the DDI application 124 may use to display a commercial associated with the desktop icon and/or animate the desktop icon. Below, process 500 is described with reference to FIGS. 6A-6C and 7.

Figure 6A:
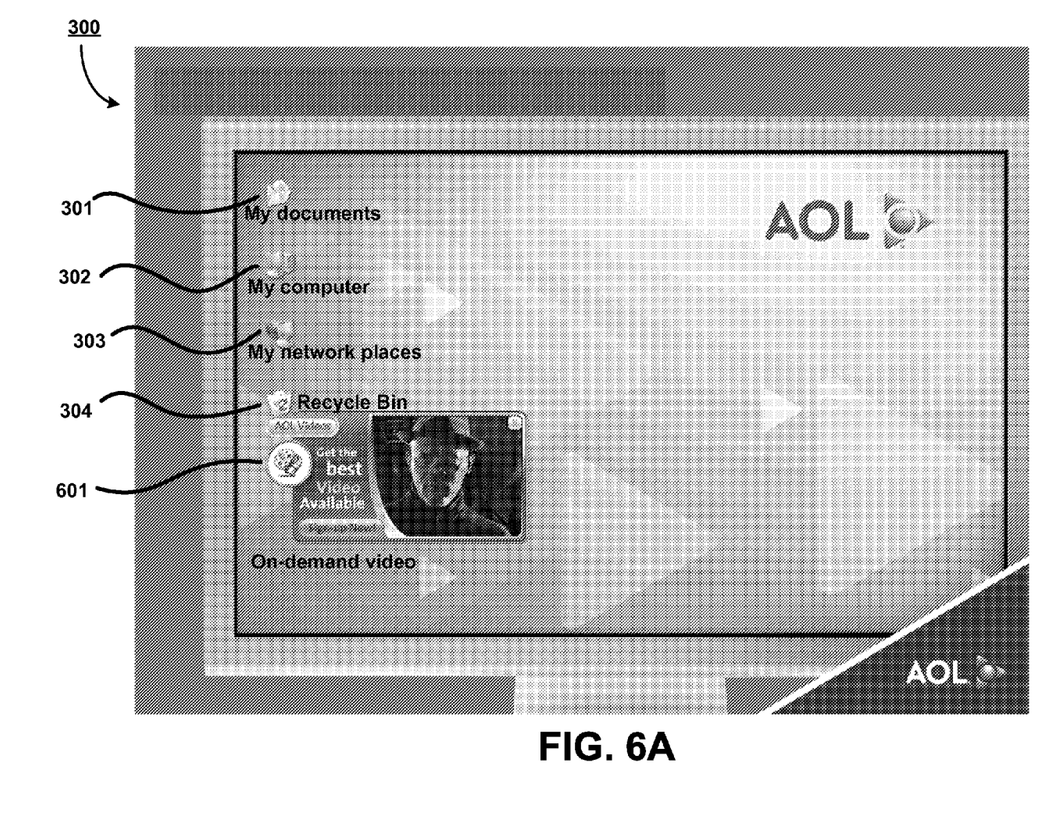
FIGS. 6A-6C illustrate an example of a commercial associated with a dynamic desktop icon.
Figure 6B:
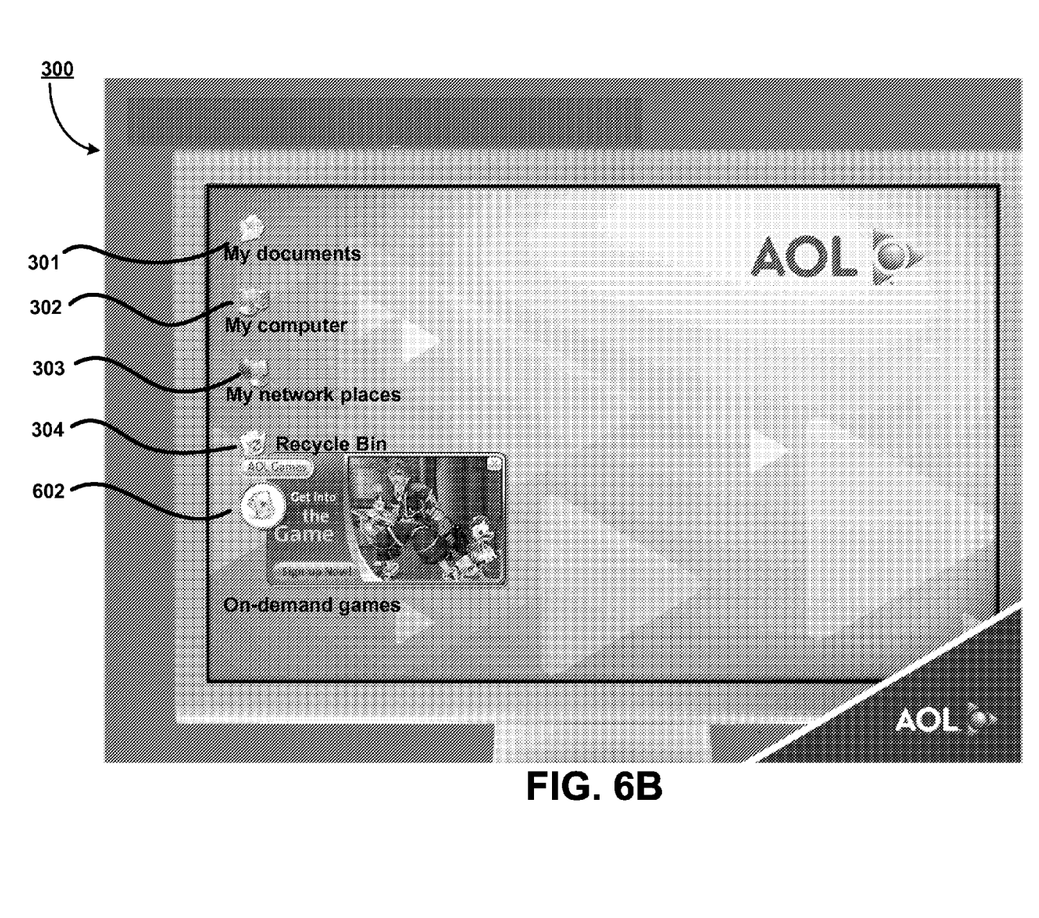
Figure 6C:
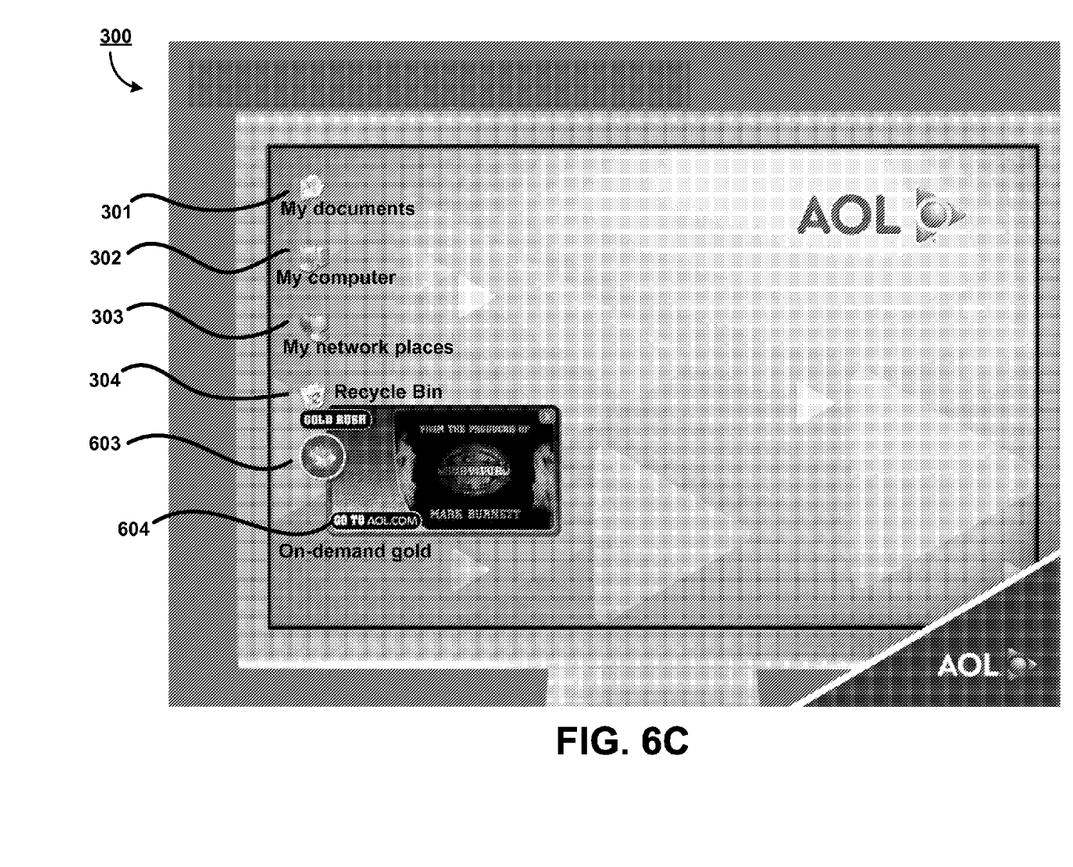
Figure 7:
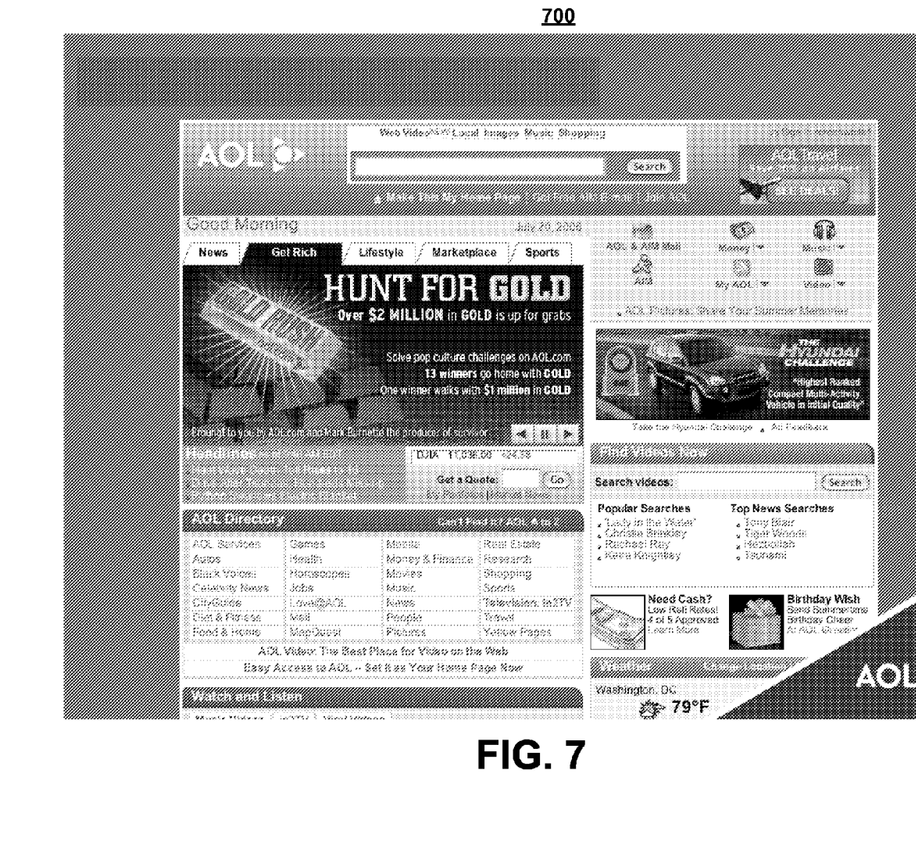
FIG. 7 illustrates an example of a web page that is reviewed and presented in response to an activation of a dynamic desktop icon.

Process 500 begins with the DDI application 124 displaying a desktop icon on a computer desktop (510). FIGS. 6A-6C illustrate a desktop icon being displayed on the computer desktop 300 by the DDI application 124. For example, as shown in FIG. 6A, the DDI application 124 displays a desktop icon 601 that is configured to execute a broadband video application. In FIG. 6B, the DDI application 124 displays a desktop icon 602 that is configured to execute a broadband game application. In FIG. 6C, the DDI application 124 displays a desktop icon 603 that is configured to execute a browser application.

Once the icon is displayed, the DDI application 124 detects a triggering event (520). Detecting the triggering event may include detection of a mouse over the displayed icon. Alternatively, detecting the triggering event may include detection of a mouse click on the displayed icon. In response to the triggering event (e.g., a mouse click and/or mouse over), the DDI application 124 may launch a commercial (e.g., information or promotional video) relating to the icon, which may attract the user's attention and provide the user with more information about the icon and the services associated therewith, thereby encouraging the user to exploit the services offered by the icon. The commercial played may include within the commercial window a designated link and/or another icon that when selected (e.g., "clicked on") will launch a specified target application. The target application may include an ISP client and/or a browser configured to display a specific uniform resource locator relating to the displayed icon and the commercial. In a slightly modified scenario, the triggering event may include the amount of time changed to the computer's internal clock and based on the amount of elapsed time the DDI application 124 animates the icon or plays a mini commercial relating to the icon. To animate the icon, the DDI application 124 may directly manipulate the icon displayed on the computer desktop. In one specific example, the desktop icon may be composed of several (e.g., 12) slightly different icon files. The DDI application 124 then displays each one of these in a rapid sequence, resulting in an appearance of motion and thus animation.

Detecting the triggering event may alternatively or additionally include monitoring the time that has passed since the icon has been displayed on the computer desktop and playing the commercial and/or animating the icon after a certain elapsed time. As such, using the process 500, the DDI application 124 can minimize the number of the icons that go unnoticed by animating them to grab the user's attention. Once the user has noticed the icon, the user may click on the icon and execute the application linked to the icon. For example and referring to FIG. 6C, the activation of "Gold Rush promotion" icon 603 may launch a browser that is configured to display a first web page 700 illustrated in FIG. 7.

FIGS. 6A-6C illustrate examples of icons and related commercials. For example, as shown in FIG. 6A, if the broadband video icon 601 is activated or another triggering event occurs, a mini commercial relating to the best videos is displayed to the user. In another example, as shown in FIG. 6B, if the broadband game icon 602 is activated or another triggering event occurs, a mini commercial about the on-demand games is displayed to the user. In yet another example, if the broadband "Gold Rush promotion" icon 603 is activated or another triggering event occurs, a commercial regarding a "Gold Rush promotion" is displayed to the user. In one scenario, the user may click on the icon 601, 602, or 603 and, in response, the commercial related to the icon 601, 602, or 603 is displayed to the user. The commercial window may include a designated link and/or another icon (e.g., 604 in FIG. 6C) that when selected (e.g., "clicked on") launches a browser configured to display the specific uniform resource locator related to the commercial/icon. In a slightly different scenario, the user may bring the mouse over the icon 601, 602, or 603. This action may display the commercial associated with the icon 601, 602, or 603. And, if the user actually clicks on the icon 601, 602, or 603, the browser is launched. In the first scenario, the icon 601, 602, or 603 is configured to execute the corresponding application directly when the user selects the icon 601, 602, or 603. In the second scenario, the icon 601, 602, or 603 is configured to execute the corresponding application indirectly by providing a commercial that contains a link or additional icon that launches the application when selected by the user.

Figure 8:
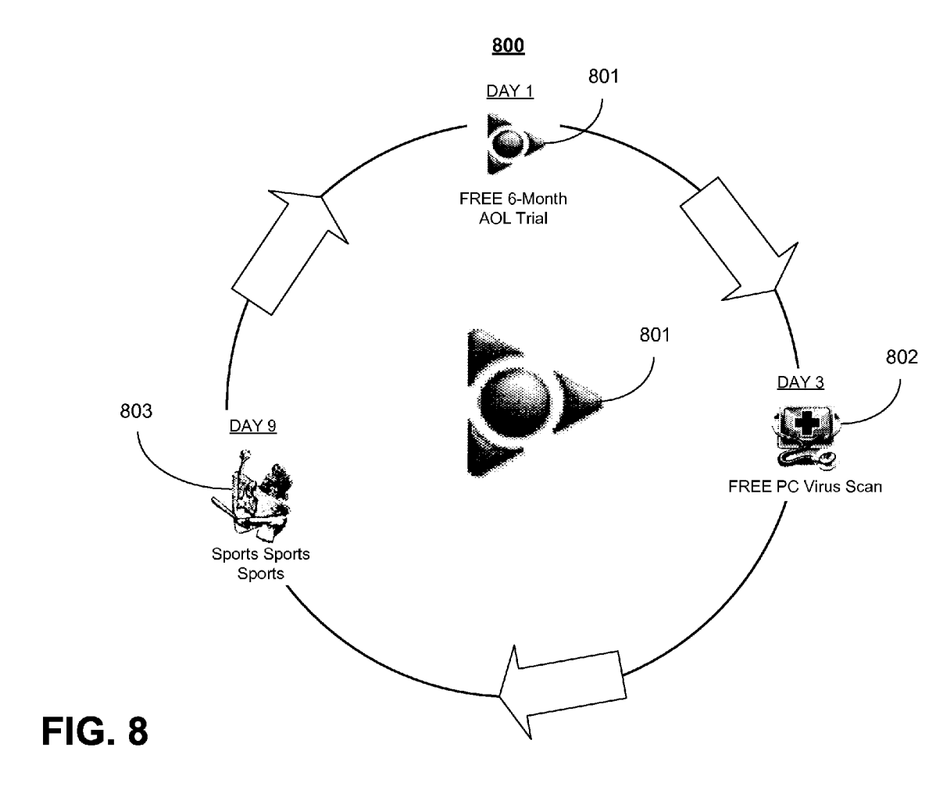
FIG. 8 illustrates an example of a cycle that shows how a dynamic desktop icon temporarily changes from a first desktop icon to other desktop icons and then back to the first desktop icon.

Referring to FIG. 8, in some implementations, the DDI application 124 continuously changes a desktop icon appearing on a single location on a computer desktop. This implementation may maximize the number of icons that can be displayed in a single position and also may attract the user's attention to the dynamic icons displayed in the single location. Through such management of the single icon space and subsequent icon changes within that space, OEMs and their partners may be able to maximize the number of icons (and associated promotions) that are presented to consumers on the computer desktop.

FIG. 8 illustrates an example of a cycle 800 showing how a dynamic desktop icon temporarily changes from a first desktop icon to other desktop icons and then back to the first desktop icon. The cycle 800 includes a dynamic "Free 6-Month AOL® Trial" icon 801 that is first displayed on the computer desktop. After a certain time period has elapsed (e.g., 3 days), the "Free 6-Month AOL® Trial" icon 801 changes to a "Free PC Virus Scan" icon 802, and after a certain time period has elapsed (e.g., 6 days), the "Free PC Virus Scan" icon 802 changes to the "Sport" icon 803. After a certain time period has elapsed, the "Sport" icon 803 changes back to the "Free 6-Month AOL® Trial" icon 801 and the process continues. In another implementation, additional desktop icons may be included in the cycle 800 and/or different desktop icons may be included in the cycle 800.

Variations of or additions to the implementations described above are possible. For example, the computer desktop although refereed throughout the application as being displayed on a computer desktop, it may be displayed on other devices such as, for example, a mobile device and PDA. As another example, the DDI application 124, upon being installed, may identify one or more particular desktop icons and/or shortcuts, which are displayed on the computer desktop and are associated with an online service provider (e.g., AOL®), and the DDI application 124 may change or modify some or all of the identified desktop icons. In another example, the DDI application 124 does not change/modify the desktop icons and/or shortcuts installed after the end user has gone through the Windows Welcome Process. In another example, the DDI application 124 may identify that the user already subscribers to the services being promoted by the various icons. In this scenario the DDI application 124 may not change/modify the desktop icons (i.e., the icons may be left as static icons). This may help to reduce user annoyance that may result from aggressively promoting services to which the user already subscribes.

The DDI application 124 may not override a user's deletion of the dynamic desktop icon displayed on the computer desktop. In particular, if the dynamic desktop icon and/or shortcut is removed by the user, that icon or shortcut will not be displayed again to the user. For example and referring again to FIG. 8, if the user removes one of the dynamic icons displayed in the cycle 800, the DDI application 124 may not display that icon to the user and instead only display the remaining icons to the user (or the DDI application may not display any more icons). In particular, the DDI application 124 may automatically uninstall and remove the files associated with the DDI application 124 from the computer upon the next startup of the PC.

In another example, the provider of the DDI application may have the ability to modify/update the bitmaps, text, hover-texts, and program or uniform resource locator associated with the desktop icon when the business rules are triggered. In one specific example, the user may request, from the DDI application provider or another entity that additional desktop icons and/or additional commercials appear on the computer desktop. To do so, in one implementation, when the computer system is connected to the internet, a user interface (e.g., a browser interface) may be presented to the user, enabling the user to opt-in for additional features. Furthermore, when the user opts-in for additional features (or, in some implementations, regardless of whether the user opts-in), other aspects, such as the business rules, may be updated.

The details of the implementations set forth in this document may enhance management and value of icon placements within the constraints of a computer desktop. This may be the case when the techniques are implemented with one or more of the following capabilities. The ability to consecutively display multiple desktop icons at specified time intervals using the desktop space allocated to a single icon (e.g., the ability to consecutively display up to 100 icons in a single icon space). The ability to animate the desktop icon(s) at specified time intervals and/or to launch and display promotional videos (with integrated sound and effects) when the icon is selected. The ability to access real-time registration systems for the service featured as the desktop icon at the specified time interval and/or to automatically configure icon placements to provide access to services/applications that are relevant to the PC user.

Other implementations are within the scope of the following claims. For example, changing the first desktop icon to the second desktop icon includes changing the first desktop icon to the second desktop icon by directly modifying the first desktop icon to provide the functionality associated with the second desktop icon upon detection of the triggering event. Alternatively or additionally, changing the first desktop icon to the second desktop icon includes replacing the first desktop icon with the second desktop icon. Other implementations also are contemplated.

What is claimed is:

1. A method comprising:
   displaying, in a visible region of a computer desktop that is displayed by a computer system, a desktop icon that is configured to enable execution of an application;
   changing the desktop icon to another desktop icon configured to enable execution of another application, the changing based on a condition other than user interaction with the desktop icon, wherein the other desktop icon was not displayed prior to the change;
   detecting one or more trigger events related to the desktop icon or to the other desktop icon; and
   in response to the detection of the one or more trigger events, displaying a window on the desktop and, within the window, displaying a promotional video or promotional animation associated with the desktop icon related to the one or more trigger events, wherein the window was not displayed on the computer desktop prior to the detection of the one or more trigger events.

2. The method of claim 1, wherein displaying the desktop icon includes displaying the desktop icon on an original equipment manufacturer computer system.

3. The method of claim 1, wherein the application includes a browser configured to automatically load a resource located at a uniform resource locator.

4. The method of claim 1, wherein detecting one or more trigger events related to the desktop icon includes detecting an amount of time that has passed since the desktop icon was first displayed.

5. The method of claim 1, wherein detecting one or more trigger events related to the desktop icon includes detecting that an input device of the computer system has selected the desktop icon.

6. The method of claim 1, wherein detecting one or more trigger events related to the desktop icon includes detecting that a marker associated with an input device of the computer system has overlapped the desktop icon, without selecting the desktop icon, for a predetermined amount of time.

7. The method of claim 1, wherein displaying the window includes displaying the promotional video with a link that is selectable to launch a specified target application.

8. A non-transitory computer-usable medium having a computer program embodied thereon, the computer program comprising instructions for causing a computer system to perform the following operations:
   display, in a visible region of a computer desktop that is displayed by a computer system, a desktop icon that is configured to enable execution of an application;
   change the desktop icon to another desktop icon configured to enable execution of another application, the change based on a condition other than user interaction with the desktop icon, wherein the other desktop icon was not displayed prior to the change;
   detect one or more trigger events related to the desktop icon or to the other desktop icon; and
   in response to the detection of the one or more trigger events, display a window on the desktop and, within the window, displaying a promotional video or promotional animation associated with the desktop icon relating to the one or more trigger events, wherein the window was not displayed on the computer desktop prior to the detection of the one or more trigger events.

9. The medium of claim 8, wherein the instructions for causing the computer system to display the desktop icon include instructions for causing the computer system to display the desktop icon on an original equipment manufacturer computer system.

10. The medium of claim 8, wherein the application includes a browser configured to automatically load a resource located at a uniform resource locator.

11. The medium of claim 8, wherein the instructions for causing the computer system to detect one or more trigger events related to the desktop icon include instructions for causing the computer system to detect an amount of time that has passed since the desktop icon was first displayed.

12. The medium of claim 8, wherein the instructions for causing the computer system to detect one or more trigger events related to the desktop icon includes instructions for causing the computer system to detect that an input device of the computer system has selected the desktop icon.

13. The medium of claim 8, wherein the instructions for causing the computer system to detect one or more trigger events related to the desktop icon includes instructions for causing the computer system to detect that a marker associated with an input device of the computer system has overlapped the desktop icon, without selecting the desktop icon, for a predetermined amount of time.

14. The medium of claim 8, wherein the instructions for causing the computer system to display the window includes instructions for causing the computer system to display a link in the window that will launch a specified target application.

* * * * *